(12) United States Patent
Ullrich et al.

(10) Patent No.: US 12,403,880 B2
(45) Date of Patent: Sep. 2, 2025

(54) VACUUM-BOOSTED BRAKING SYSTEM HAVING REDUNDANCY

(71) Applicant: Continental Automotive Technologies GmbH, Hannover (DE)

(72) Inventors: Thorsten Ullrich, Gernsheim (DE); Tibor Toth, Frankfurt am Main (DE); Martin Kraft, Grävenwiesbach (DE); Manfred Liebl, Karlskron (DE); Bernd Zielke, Schrobenhausen (DE); Stefan Daffner, Hepberg (DE); Andreea Cenuse, Lippertshofen (DE)

(73) Assignee: Continental Automotive Technologies GmbH, Hannover (DE)

( * ) Notice: Subject to any disclaimer, the term of this patent is extended or adjusted under 35 U.S.C. 154(b) by 483 days.

(21) Appl. No.: 17/904,944

(22) PCT Filed: Feb. 11, 2021

(86) PCT No.: PCT/DE2021/200013
§ 371 (c)(1),
(2) Date: Aug. 24, 2022

(87) PCT Pub. No.: WO2021/170184
PCT Pub. Date: Sep. 2, 2021

(65) Prior Publication Data
US 2023/0086943 A1    Mar. 23, 2023

(30) Foreign Application Priority Data

Feb. 26, 2020  (DE) ............... 10 2020 202 440.5
May 15, 2020   (DE) ............... 10 2020 206 179.3

(51) Int. Cl.
*B60T 17/02*      (2006.01)
*B60T 13/66*      (2006.01)
(Continued)

(52) U.S. Cl.
CPC ............ *B60T 17/02* (2013.01); *B60T 13/662* (2013.01); *B60T 13/72* (2013.01); *B60T 17/222* (2013.01);
(Continued)

(58) Field of Classification Search
CPC ..................................................... B60T 17/222
See application file for complete search history.

(56) References Cited

U.S. PATENT DOCUMENTS 5,971,500 A    10/1999  Voges et al.
6,186,601 B1    2/2001  Linden
(Continued)

FOREIGN PATENT DOCUMENTS

CN    201080185 Y  *  7/2008
CN    101284530 A     10/2008
(Continued)

OTHER PUBLICATIONS

Office action dated Dec. 20, 2023 of counterpart CN application No. 202180016944.6.
(Continued)

*Primary Examiner* — Melody M Burch

(57) ABSTRACT

A hydraulic braking system has a vacuum brake booster, an ESC system with a hydraulic pump for generating braking force in a wheel-specific manner in a plurality of wheel brakes, an ESC control device for driving the hydraulic pump and a hydraulic pressure sensor for determining a hydraulic pressure in the hydraulic braking system. For electrified vehicles, an electric vacuum pump is provided for supplying the vacuum brake booster, wherein the ESC control device is designed to drive the electric vacuum pump logically and electrically.

14 Claims, 4 Drawing Sheets

(51) Int. Cl.
  *B60T 13/72*   (2006.01)
  *B60T 17/22*   (2006.01)

(52) U.S. Cl.
  CPC ... *B60T 2270/306* (2013.01); *B60T 2270/308* (2013.01); *B60T 2270/84* (2013.01); *B60Y 2200/91* (2013.01); *B60Y 2306/13* (2013.01); *B60Y 2400/81* (2013.01)

(56) References Cited

U.S. PATENT DOCUMENTS

| | | |
|---|---|---|
| 2003/0168908 A1 | 9/2003 | Robinson |
| 2009/0230762 A1 | 9/2009 | Giers et al. |
| 2010/0005796 A1 | 1/2010 | Schonlau et al. |
| 2012/0141299 A1 | 6/2012 | Bang et al. |
| 2016/0325719 A1 | 11/2016 | Linhoff et al. |

FOREIGN PATENT DOCUMENTS

| | | | | |
|---|---|---|---|---|
| CN | 101716890 A | * | 6/2010 | |
| CN | 102815290 A | | 12/2012 | |
| CN | 105083250 A | | 11/2015 | |
| CN | 107200001 A | * | 9/2017 | |
| CN | 109843673 A | * | 6/2019 | ............. B60T 13/66 |
| CN | 209689817 U | * | 11/2019 | |
| DE | 19542654 A1 | | 5/1997 | |
| DE | 19859072 A1 | | 3/2000 | |
| DE | 10156401 A1 | | 8/2002 | |
| DE | 102006044509 A1 | | 1/2008 | |
| DE | 102006046478 A1 | | 1/2008 | |
| DE | 102009010403 A1 | | 9/2009 | |
| DE | 102011077107 A1 | | 12/2012 | |
| DE | 102014220441 A1 | | 7/2015 | |
| JP | 2009511337 A | | 3/2009 | |
| JP | 2012254788 A | | 12/2012 | |
| KR | 19990067559 A | | 8/1999 | |
| WO | 2007042561 A1 | | 4/2007 | |

OTHER PUBLICATIONS

Office action dated Feb. 29, 2024 of counterpart KR application No. 10-2022-7026790.
Chinese Notice of Allowance dated May 11, 2024 for the counterpart Chinese Patent Application No. 202180016944.6 and machine translation of same.
German Search Report dated Feb. 3, 2021 for the counterpart German Patent Application No. 10 2020 206 179.3.
The International Search Report and the Written Opinion of the International Searching Authority mailed on Jun. 23, 2021 for the counterpart PCT Application No. PCT/DE2021/20013.
European Union: Regulation No. 13-H Economic Commission for Europe of the United Nations (UN/ECE)—Uniform conditions for the approval of passenger cars with regard to brakes. In: Official Journal of the European Union. Supplement, 2015, H. 335, pp. 1-84.—ISSN 1977-06/.2.

* cited by examiner

VACUUM-BOOSTED BRAKING SYSTEM HAVING REDUNDANCY

CROSS-REFERENCE TO RELATED APPLICATIONS

The present application is a National Stage Application under 35 U.S.C. § 371 of International Patent Application No. PCT/DE2021/200013 filed on Feb. 11, 2021, and claims priority from German Patent Applications No. 10 2020 202 440.5 filed on Feb. 26, 2020, and No. 10 2020 206 179.3 filed on May 15, 2020, in the German Patent and Trademark Office, the disclosures of which are herein incorporated by reference in their entireties.

TECHNICAL FIELD

The invention relates to hydraulic braking system having a vacuum brake booster and also an ESC system with a hydraulic pump for generating braking force in a wheel-specific manner in a plurality of wheel brakes, an ESC control device for driving the hydraulic pump and also a hydraulic pressure sensor for determining a hydraulic pressure in the hydraulic braking system.

BACKGROUND

The electrification of motor vehicle drives and the associated complete restructuring of said drives results in new requirements being made of the braking systems thereof. In the case of hybrid-electric drives and, in particular, in the case of fully electric drives, there is in particular no vacuum available as auxiliary energy for brake boosting.

Furthermore, the requirements made of the braking system in respect of implementing driver assistance functions and safety functions remain.

Solutions for these requirements are known on the market for electronic braking systems. For example, the conventional vacuum brake booster can be replaced by an electric brake booster, thereby making the braking system independent of a vacuum supply.

An integrated simulator braking system (brake-by-wire) can also be used to meet the requirements of electrified vehicles. A simulator braking system additionally offers particularly high efficiency in the case of regenerative braking.

However, the two architectures, both of the electric brake booster and the integrated simulator braking system, are associated with considerable additional costs compared to conventional braking systems with vacuum brake boosters.

Therefore, a braking system architecture that meets the requirements of electrified vehicles at significantly lower costs is not known until now.

SUMMARY

An electric vacuum pump is provided to supply the vacuum brake booster, wherein the ESC control device is designed to drive the electric vacuum pump logically and electrically.

An ESC system (stability control or vehicle dynamics control) is an electronically controlled driver assistance system for motor vehicles that prevents the vehicle from swerving by braking individual wheels in a targeted manner. For this purpose, the system has a hydraulic pump with which a braking pressure can be built up in the braking system independently of the driver. The brake pressure generated by the hydraulic pump is distributed to the wheel brakes to be braked in each case by appropriately driving hydraulic valves that are usually present in the braking system.

The vacuum brake booster is usually arranged in the motor vehicle between a brake pedal and a master brake cylinder which pushes the brake fluid into the line system of the braking system to the individual wheel brakes. In a simple variant, this vacuum brake booster has a working diaphragm which separates a working chamber from a vacuum chamber, both of which are under vacuum in the inoperative position. When the brake pedal is actuated, atmospheric pressure is applied to the pedal-facing side of the diaphragm, the working chamber, via a valve, so that the pressure difference then prevailing produces a force that assists the force applied to the pedal in the same direction.

In order to generate the vacuum, an electric vacuum pump is used, the logical driving of which, i.e. the control of the vacuum pump, for example in respect of switching on, switching off, the speed and/or the power, is taken over by the ESC control device. The electrical driving, that is to say the power supply to the vacuum pump, is also provided directly via the ESC control device.

Therefore, the vehicle does not require external switching components, such as any relays, that would have to be integrated into the electrical architecture of the vehicle. In addition, the integration of the electrical driving of the vacuum pump allows enhanced diagnostic options, for example for the detection of tears or short circuits as well as safe switch-off of the pump in the event of a fault.

In one embodiment, the ESC control device has two control units, each with its own processor, wherein the two control units are designed to each perform some of the functions of the ESC control device during normal operation. The first and the second control unit are accommodated in a common housing, specifically that of the ESC system. The housing can be equipped with a common plug or alternatively with two separate plugs for producing the electrical connections. In order to implement redundancy, in the event of a fault in one of the control units, at least some of its respective functions can be taken over by the respective other control unit. This ensures a high level of fail-safety, as is particularly required for partially autonomous driving.

In a further embodiment, the functions for wheel slip control and/or a stability program are implemented on a first control unit during normal operation. This includes, for example, driving of the hydraulic pump, switching of hydraulic valves, detection of the hydraulic pressure sensor and/or detection of yaw rate and acceleration sensors.

In a further embodiment, the functions for driving the vacuum pump are implemented on a second control unit during normal operation. Therefore, even if the first control unit with the functions implemented on it fails, brake boosting can be ensured by means of the vacuum brake booster and the vacuum pump.

In a further embodiment, the vacuum brake booster has a vacuum sensor which is connected to the ESC control device, for example the second control unit, wherein the ESC control device, for example the second control unit, is designed to drive the vacuum pump based on the data from the vacuum sensor.

In addition, it is possible to include other signals that are available to the ESC system as standard, for example the wheel speed sensor signals for determining the vehicle speed, in the drive strategy of the electric vacuum pump.

In a further embodiment, the second control unit is designed to activate a first fallback level in the event of a failure of the functions for detecting the vacuum sensor, that is to say, for example, the vacuum sensor itself, the transmission path and/or the evaluation electronics, in order to react to the absence of the information about the vacuum brake booster. In this fallback level, the vacuum pump is activated when braking occurs. The vacuum pump can only be activated when braking is initiated and/or when the brake pressure is increased for a specified time since, with a constant brake pressure, no further air, which would have to be sucked out by the vacuum pump, is sucked into the vacuum brake booster. However, for safety purposes, the vacuum pump can also be activated during the entire braking process, for example with a specified run-on time. In this case, the first control unit is designed to establish braking occurring by evaluating the data from the hydraulic pressure sensor and to transmit this information to the second control unit via a communication link. Therefore, this first fallback level benefits from the implementation of driving of the vacuum pump by the ESC control device since the necessary identification of braking can take place within the ESC control device and does not have to be communicated via a vehicle bus with its substantially longer transmission times.

In a further embodiment, the ESC control device is designed to carry out brake boosting by means of the hydraulic pump if the vacuum pump fails. Failure of the vacuum pump can affect the mechanics and electronics themselves and/or the driving thereof. For example, the first control unit is designed to carry out brake boosting by means of the hydraulic pump if the vacuum pump and/or the entire second control unit fail/fails. Therefore, by implementing the vacuum pump control in the ESC control device, it can carry out redundant brake boosting in the event of a failure.

In a another embodiment, the ESC control device is designed to determine a run-out point of the vacuum brake booster from data from the vacuum sensor. For this purpose, a corresponding characteristic curve of the vacuum brake booster can be stored in the ESC control device, for example in the first control unit, which links the prevailing vacuum, as can be measured by the vacuum sensor, to the run-out point. The ESC control device is also designed to identify exhaustion of the vacuum brake booster. This is done by comparing the hydraulic pressure, as is determined by the hydraulic pressure sensor, with the run-out point. If the hydraulic pressure is greater than the run-out point, the vacuum brake booster is exhausted and the portion of the pressure that exceeds the run-out point is generated by the driver without being boosted. Brake boosting is then carried out by means of the hydraulic pump in the event of exhaustion. In addition to activating the hydraulic pump, the hydraulic valves are driven in such a way that the pressure from the hydraulic pump is routed to the wheel brakes. Therefore, in addition to the brake boosting by the vacuum brake booster, a fallback level is available. This is activated if the electric vacuum pump or its drive circuit in the ESC system fails or if there is a vacuum leak and a resulting loss of vacuum in the vacuum chamber of the vacuum brake booster.

In a further embodiment, the ESC control device is designed to generate a boost pressure by means of the hydraulic pump for the purpose of brake boosting. The level of the set boost pressure is calculated from the difference between the hydraulic pressure and the run-out point multiplied by a boost factor. This can be stored in the ESC control device and lie between 1 and 10, e.g. 2 and 8, particularly 3 and 5, for example.

In another embodiment, the ESC control device is designed to set the value of the run-out pressure for determining the boost pressure to 0 bar if the vacuum sensor and the vacuum pump fail, wherein the boost factor is reduced. That is to say, there are at least two different boost factors, which are stored in the ESC control device. If the vacuum sensor system fails, that is to say if the actual run-out point is unknown, a smaller boost factor is used than when the run-out point is known. This prevents the brake from reacting disproportionately sharply if double the brake boosting is carried out owing to boosting by the vacuum brake booster still occurring. For example, a boost factor can be reduced from 4 to 3.

In a further embodiment, the ESC control device is designed to increase the reduced boost factor during braking, until the original value is reached again. For example, the boost factor can be increased at the start of braking, when the brake pedal is moved from the inoperative position and/or the brake pressure exceeds a threshold value. That is, the boost factor can be adjusted at the end or after braking, for example when the brake pressure falls below a threshold value. Here, the increase can only take place partially in each case, so that the original value is only reached again after a predetermined number of braking operations. The boost factor can also be increased when the brake pressure is reduced.

In a further embodiment, the ESC control device is designed to determine the value of the run-out pressure for determining the boost pressure from the last known measured value from the vacuum sensor if the vacuum sensor and the vacuum pump fail, wherein, in the case of each braking operation, a decrease in the run-out point is calculated on the basis of the maximum hydraulic pressure reached during this braking operation and the run-out point is accordingly reduced. Since the vacuum in the vacuum brake booster should remain constant except for small leaks and a brake-pressure-dependent portion of the vacuum is only consumed when braking is carried out, such an adjustment of the run-out pressure leads to a good estimate of reality. Accordingly, the brake boosting is adjusted precisely. A corresponding model can be stored in the control device in order to determine the necessary adjustment of the run-out point.

In a further embodiment, two parking brake actuators are provided, with the driving of the parking brake actuators being distributed amongst the control units. That is to say, the first control unit is designed to drive a first parking brake actuator and the second control unit is designed to drive a second parking brake actuator. The previous redundancy of the parking function of vehicles by means of an electric parking brake and a lock of the transmission is therefore eliminated and therefore no additional effort is required to implement this in the drive train of such vehicles.

Further features, advantages and possible applications also result from the description of exemplary embodiments that follows and the drawings. Here, all of the features described and/or illustrated in the figures form the subject matter of the invention both individually and in any desired combination, even independently of the composition thereof in the claims, or the back-references thereof.

DETAILED DESCRIPTION

Figure 1:
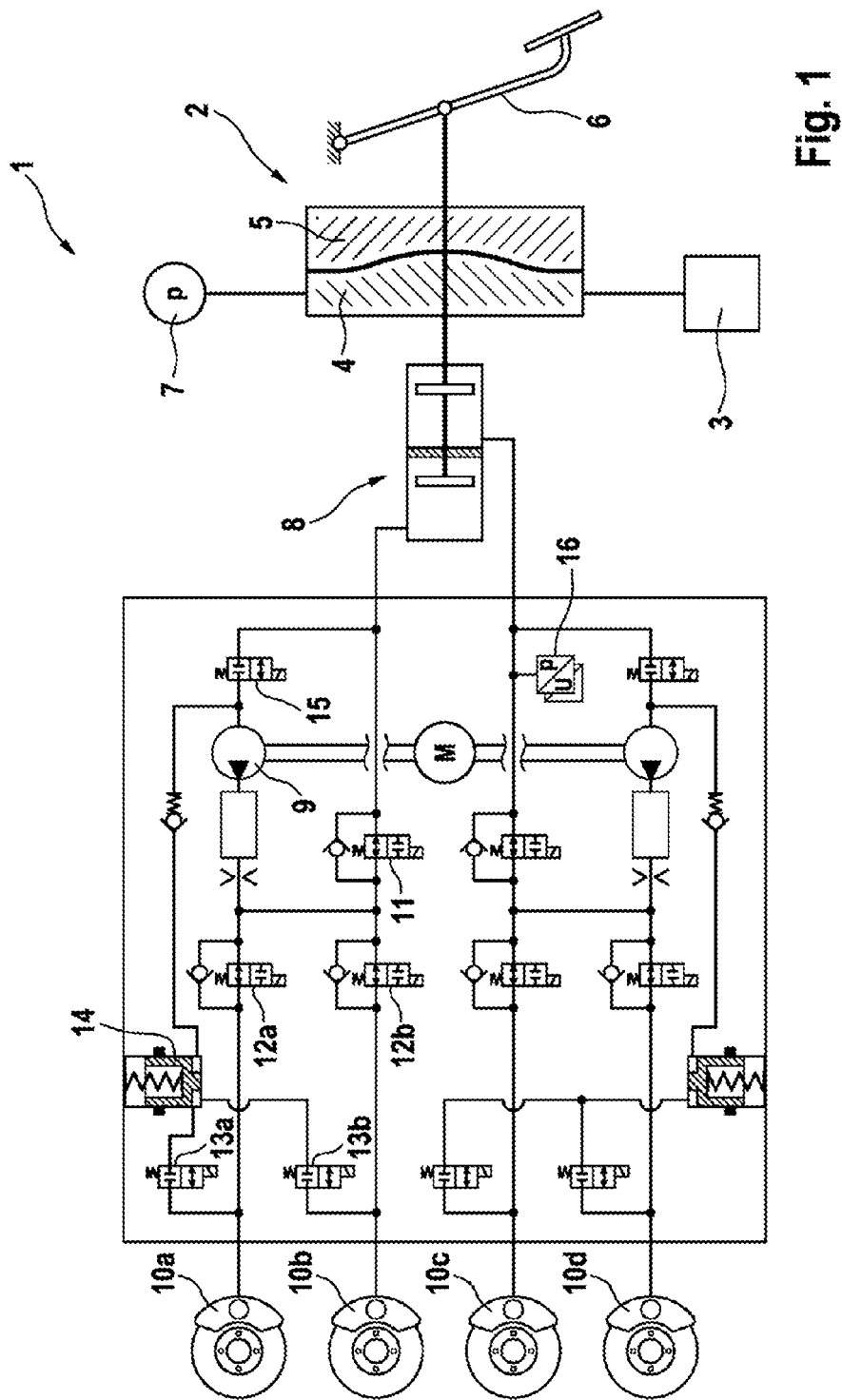
FIG. 1 schematically shows the hydraulic architecture of a braking system,
FIG. 2 schematically shows the electronic architecture of a braking system of a first embodiment, FIG. 3 schematically shows the electronic architecture of a braking system of a second embodiment.

FIG. 1 shows a hydraulic braking system 1 with a vacuum brake booster 2 which is supplied by an electric vacuum pump 3. The vacuum brake booster 2 has a vacuum chamber 4 and a working chamber 5, which are separated by a diaphragm. In the inoperative state, both the vacuum chamber 4 and the working chamber 5 are evacuated and therefore have an air pressure lower than atmospheric pressure. If a brake pedal 6 is actuated by a driver, a braking force is exerted on the tandem master brake cylinder 8. At the same time, a valve of the vacuum brake booster 2 is opened, so that air can flow into the working chamber 5, this creating a differential pressure between the vacuum chamber 4 and the working chamber 5, this differential pressure pushing the diaphragm in the direction of the master brake cylinder 8 and thereby exerting a force on the master brake cylinder 8. When the brake pedal 6 is released, the external valve is closed and a valve between the vacuum chamber 4 and the working chamber 5 is opened, as a result of which said working chamber is evacuated again by the vacuum pump 3 via the vacuum chamber 4. A vacuum sensor 7 detects the air pressure in the vacuum chamber 4 in order to activate the vacuum pump 3 as required.

The hydraulics of the hydraulic braking system 1 are explained below with reference to the upper brake circuit. Said brake circuit has a hydraulic pump 9 which is designed to build up brake pressure in the wheel brakes 10a and 10b independently of the driver. The wheel brakes 10c and 10d are supplied in an equivalent manner via the lower brake circuit, which is of substantially identical construction. During normal operation, the hydraulic pressure provided by the tandem master brake cylinder 8 is conducted directly into the wheel brakes 10a and 10b through an open hydraulic valve (master cylinder isolation valve—MCI) 11 and the open inlet valves 12a and 12b. For a driver-independent braking intervention, as is initiated for example with an ESC intervention, the hydraulic valve (MCI) 11 is closed and instead the hydraulic valve (low-pressure feed valve—LPF) 15 is opened. Now, the hydraulic pump 9 can deliver brake fluid in the direction of the wheel brakes 10a and 10b. In order to carry out wheel slip control, the inlet valves 12a, 12b of the vehicle are closed at least for a short time and instead the outlet valves 13a and 13b are opened, so that the brake pressure in a low-pressure accumulator 14 can be reduced.

Therefore, provision is now made for brake boosting to be carried out by the hydraulic pump 9 if the vacuum brake booster 2 or its drive electronics fails/fail.

For this purpose, the ESC control device measures the negative pressure in the vacuum chamber 4 of the vacuum brake booster 2 by means of the vacuum sensor 7 and uses this to determine the run-out point of the vacuum brake booster 2, for example from a stored characteristic curve. The run-out point in this case is the greatest possible brake pressure that can be generated by the vacuum brake booster 2. At the same time, the actual brake pressure is determined by means of a hydraulic pressure sensor 16. In this case, the hydraulic pressure sensor can be arranged in the same brake circuit or in another brake circuit, as long as the two brake circuits are operated by the same vacuum brake booster. If the actual hydraulic pressure 16 is greater than the run-out point of the vacuum brake booster 2, a portion of the braking force is generated by the driver by means of the brake pedal 6 without being boosted. In order to boost this portion of the braking force as well, the difference between the actual hydraulic pressure and the run-out point is determined and multiplied by a boost factor. The boost pressure determined in this way is now generated by driving the hydraulic pump 9. If the vacuum pump 3 fails, the vacuum in the vacuum chamber 4 increases slowly, for example with each braking operation, as a result of which the run-out point falls until it even reaches the value 0. Therefore, an ever-increasing portion of the brake boosting has to be applied by the hydraulic pump. If the run-out point is 0, the hydraulic pump 9 is activated with any minimal actuation of the brake pedal.

Figure 2:
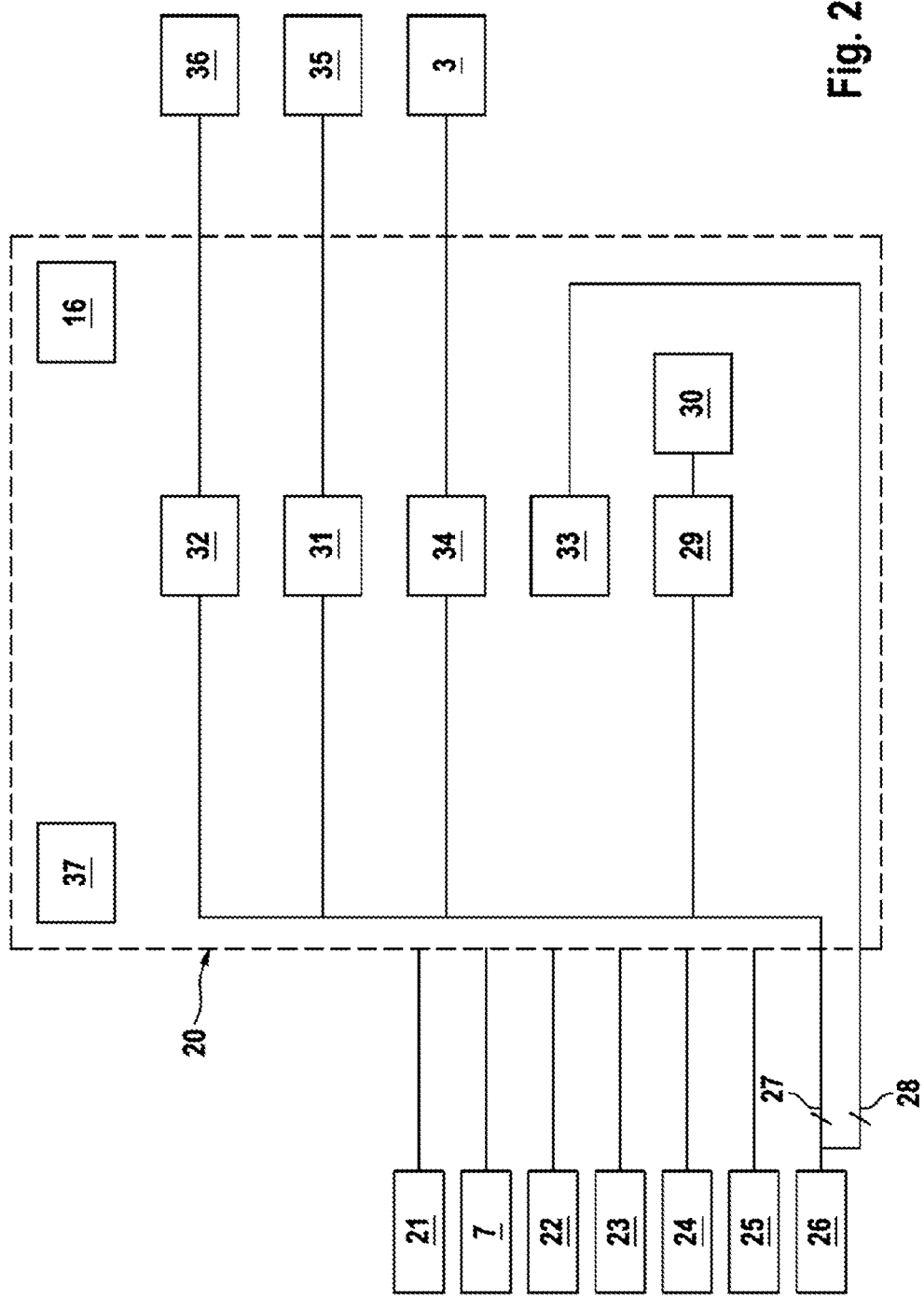

FIG. 2 shows an ESC control device 20 with its own power supply, which has a ground connection 21 and a power supply 26. The ESC control device 20 also has a connection to the vacuum sensor 7, a brake pedal travel sensor (PTS) 22 and a vehicle bus 23. A parking brake switch 24 is also connected to the ESC control device 20 and the wheel speed signals 25 from four wheel speed sensors are transmitted to the ESC control device 20. The power supply 26 of the ESC control device 20 has a first supply line 27 and a second supply line 28. The first supply line 27 serves to supply the output stages 29 of the hydraulic valves 30, the output stage 34 for driving the electric vacuum pump 3 and the output stages 31, 32 of the parking brake actuators 35, 36. The second supply line 28 supplies a driver 33 for the hydraulic pump 9, which provides brake pressure in the hydraulic brake circuit. An integrated hydraulic pressure sensor 16 is also provided in order to determine a hydraulic pressure in the braking system. A microcontroller 37 controls all output stages based on the sensor values according to the programmed operating software.

In addition to the standard interfaces and integrated sensors of the ESC system, the ESC control device likewise has the vacuum sensor 7 connected to it. The signal from said vacuum sensor is critical for driving the electric vacuum pump 3 via the vacuum pump driver 34 (EVP driver).

In this case, the ESC system is also designed as an ESC hybrid variant, in which an optional brake pedal travel sensor 22 is connected, which is used to implement the functions for regenerative braking.

Driving of the electric parking brake actuators 35, 36 is likewise provided on the ESC control device 20. A corresponding operator control element 24 is connected to the ESC control device 20 for this purpose.

Figure 3:
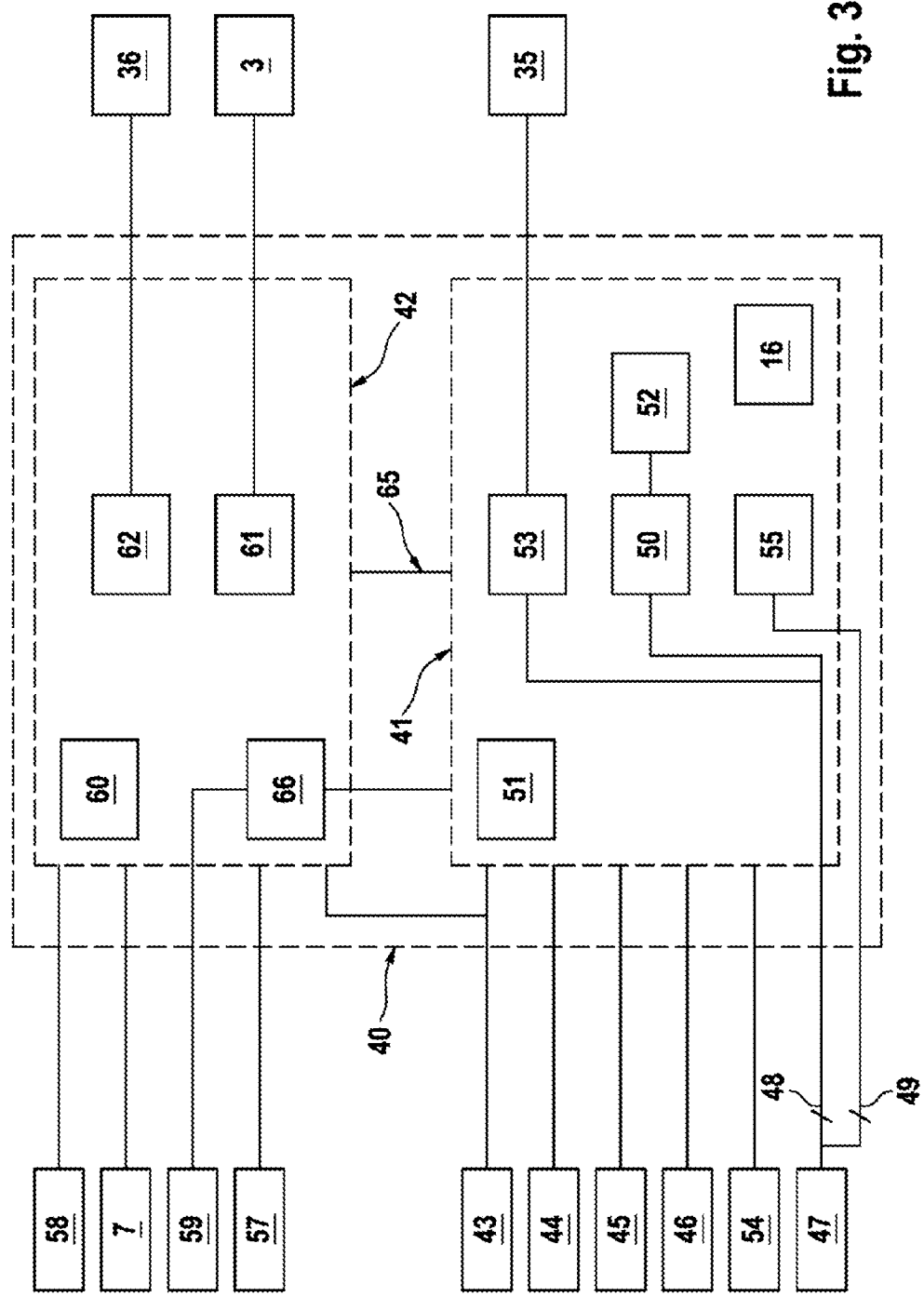

FIG. 3 shows an alternative embodiment, in which the ESC control device 40 is designed with two independent control units 41 and 42 which form sub-units of the ESC control device 40. The first control unit 41 has its own ground connection 54 and has a connection to the vehicle bus 43 in order to be able to communicate with other control devices and units of the vehicle. The data from a brake pedal travel sensor 44 are likewise made available to the first control unit 41. A parking brake switch 45 and two wheel speed sensors 46 are connected to the first control unit 41. The first control unit 41 has a power supply 47 which has two supply lines 48, 49. The first supply line 48 is used to supply the output stages 50 and the associated valve coils 52 and also the output stage 53 of an electric parking brake actuator 35. The second supply line 49 supplies the output stage 55 for the hydraulic pump 9. A microcontroller 51 receives the data from the connected sensors and from an integrated hydraulic pressure sensor 16 and, based on the data, controls the output stage 55 of the hydraulic pump 9 and also the output stage 50 of the hydraulic valves 52 and the output stage 53 of a parking brake actuator 35.

The second control unit 42 has its own power supply 58 and its own ground connection 57. The second control unit 42 is also connected to the vacuum sensor 7 and two wheel speed sensors 59. The second control unit 42 has its own computer unit 60. The dedicated microcontroller 60 drives the output stage 61 for the vacuum pump 3. The output stage 62 of a parking brake actuator 36 is also driven via the microcontroller 60. In this variant embodiment, the ESC system is equipped with electrical redundancy. This is a dual-logic system. In addition to a conventional first electronic control unit 41 with the microcomputer 51, a second control unit 42 with the second microcomputer 60 is provided. The first and the second control unit 41, 42 each have their own circuit modules for detecting the sensors required in each case and for driving the actuators via corresponding output stages.

The electronic components of the first and the second control device 41, 42 can either be arranged on a common printed circuit board (PCB), two separate printed circuit boards or else the front and the rear side of a printed circuit board.

During normal operation, i.e. when the system is free of faults, both control units 41, 42 operate simultaneously and data is exchanged between the two control units 41, 42. An internal data bus 65 is used for this purpose.

If one control unit 41, 42 fails, the respective other control unit 42, 41 continues to operate. The failure of a control unit 41, 42 is identified by diagnostic functions of this control unit 41, 42 and communicated to the respective other control unit 42, 41 via the internal data bus 65. In the event of total failure, for example of the microcomputer 60, 51 or the power supply 47, 58 of a control unit 41, 42, this is identified by the respective other control unit 42, 41 by means of the absence of communication signals via the internal data bus 65.

Some of the functions of the control device 40 are implemented in each case on the control units 41, 42. The first control unit 41 controls the electrohydraulic actuators (hydraulic pump 9, hydraulic valves 11, 15, 12, 13) of the braking system 1. All vehicle control functions such as anti-slip control (ABS), a stability program (ESP) and others are also implemented on this control device 41. The first control unit 41 also contains the integrated hydraulic pressure sensor 16 and also optionally the sensor system for detecting the yaw rate and longitudinal/lateral acceleration for the ESC functions. In an ESC hybrid variant, the brake pedal travel sensor 44 is also processed in the first control unit 41 and the regenerative braking function is carried out there.

The second control unit 42 includes the function of vacuum supply. For this purpose, the signal from the vacuum sensor 7, for example a redundant sensor with a digital interface, is processed by the second control unit 42. The control software implemented in the second control unit 42 evaluates this signal in order to drive the electric vacuum pump 3. Other signals, which the first control unit 41 provides via the internal data bus 65, can optionally be included in the drive strategy of the electric vacuum pump 3. If the first control unit 41 fails, the electric vacuum pump 3 can, however, also be driven without these additional signals. The electrical assemblies for driving the electric vacuum pump 3 are arranged on the second control unit 42.

During normal operation, the braking force is boosted by the vacuum supply implemented by the second control unit 42 by means of the electric vacuum pump 3. The first control unit 41 is not required for this purpose. Accordingly, the function of brake boosting is retained even if there is a fault in the first control unit 41 or it fails.

If a fault that prevents the vacuum from being sensed occurs in the second control unit 42 or if the vacuum sensor 7 itself fails, a fallback level implemented in the control software of this control unit 42 can be activated. In this case, for example, the electric vacuum pump 3 can always be driven during braking and for a certain time after the end of each braking operation. The presence of braking is detected here by the other control unit 41 with the aid of the integrated hydraulic pressure sensor 16 and reported to the control unit 42 via the internal data bus 65.

However, if a fault that prevents the electric vacuum pump 3 from being driven occurs in the second control unit 42 or if the control unit 42 fails completely, the other control unit 41 takes over the function of brake boosting with the aid of the electrohydraulic actuator, that is to say the hydraulic pump 9, and by corresponding control of the hydraulic valves 11, 12, 13, 15.

In this case, the hydraulic pressure in master brake cylinder 8 generated by the driver by actuating the pedal is measured with the aid of the integrated hydraulic pressure sensor 16 and compared with the run-out point of the vacuum brake booster 2. The positive difference between the master brake cylinder pressure and the run-out pressure is weighted with a boost factor and built up as an additional boost pressure in the wheel brake circuits. In the case of an ESC hybrid variant, in which a pedal travel sensor 44 is connected to the first control unit 41, its signal can optionally additionally be included in determining the boost pressure.

The run-out point is calculated here using different methods, depending on the fault present in the second control unit 42. If driving of the electric vacuum pump 3 by the control unit 42 fails or there is a fault in the electric vacuum pump 3 itself or a serious vacuum leak, the signal from the vacuum sensor 7 is still available because it is transmitted via the internal data bus 65. The run-out pressure can therefore be calculated on the basis of a characteristic curve of the vacuum brake booster 2 that is stored in the control unit 41. Since the vacuum brake booster is no longer evacuated again in the assumed fault cases, the vacuum will approach the ambient pressure with each braking operation, i.e. the run-out point will drop to zero. Once this state has been reached, the hydraulic brake boosting occurs even when the brake pedal is only slightly actuated.

Figure 4:
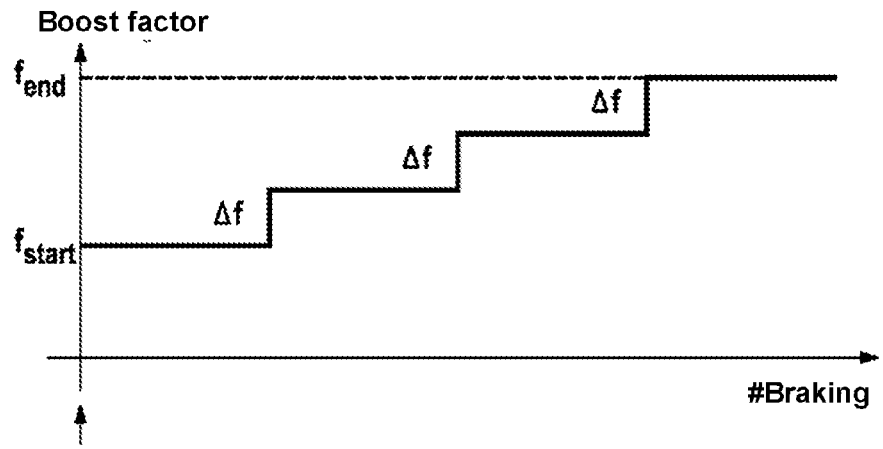
FIG. 4 shows a graph with the increase in the boost factor.
Figure 5:
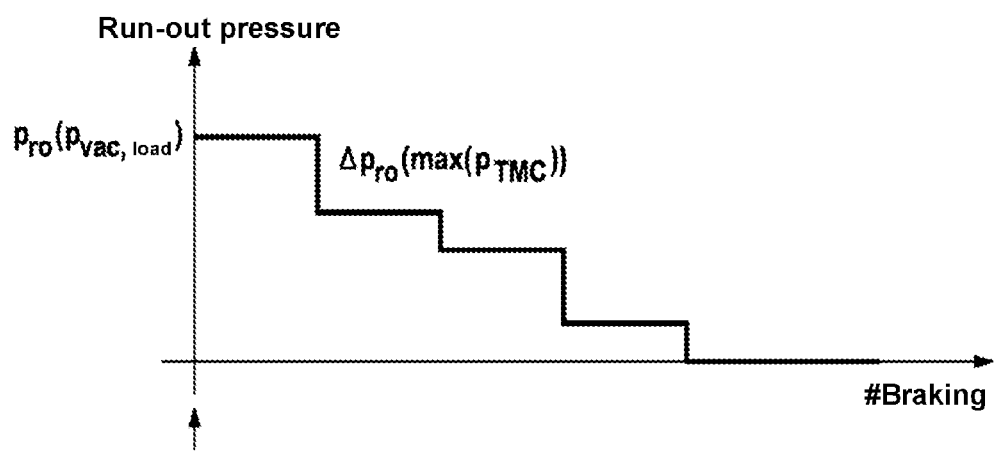
FIG. 5 shows a graph with the drop in the run-out point.

If, on the other hand, there is a complete failure of the second control unit 42, vacuum information is no longer available. In this case, a corresponding fallback strategy has to be stored in the control software of the first control unit 41. One possible approach to implementing this fallback strategy is to assume a run-out pressure of 0 bar, that is to say a total failure of the vacuum. At the same time, however, the boost factor is reduced, so that double brake boosting does not occur as long as the vacuum has not yet actually approached ambient pressure. In addition, the boost factor can be increased again to the normal value after a predetermined number of braking operations. This is illustrated in the graph of FIG. 4. At the end of each braking operation, the boost factor is increased by a small amount until the normal value is reached again. This takes into account the fact that the vacuum adapts a little more to the ambient pressure with each braking operation, and the run-out point therefore decreases. As an alternative, for this purpose, based on the last known value of the vacuum sensor, a run-out point is determined and a vacuum model is calculated in the software of the control unit 41, the model estimating a "vacuum consumption" and therefore the drop in run-out pressure with each braking operation, as illustrated by way of example in FIG. 5. Depending on the maximum brake pressure that was present during braking, the change in the run-out point is calculated for each braking operation and the run-out point is adjusted accordingly until it has reached the value 0.

During normal operation, the electric parking brakes 35, 36 are driven jointly by the two control devices 41 and 42, which each have the drive electronics 53, 62 for at least one parking brake actuator 35, 36. If one of the units fails, the parking brake is only driven by the remaining unit, that is only one parking brake actuator 35, 36 is optionally actuated. This meets the requirement for limited standstill protection in the event of a single electrical fault and there is no need for standstill protection using a gear lock.

The usual functions of what is known as standstill management (including static application and release of the parking brake when the operator control element 45 of the electric parking brake is actuated, automatic application when leaving the vehicle, automatic release when starting, etc.) are implemented in the control software of the first control unit 41. The parking brake actuator 36 that is electrically associated with the second control unit 42 is driven by the first control unit 41 by sending a drive command to the second unit 42 via the internal data bus 65.

If the first control unit 41 fails, the second control unit 42 activates a fallback level of the standstill management system and then only actuates the parking brake actuator 36 that is electrically associated with the second control unit 42.

In order to ensure that this parking brake actuator 36 is applied only when the vehicle is stationary or close to being at a standstill, at least two wheel speed sensor signals 59 are processed by the second control unit 42. During normal operation, i.e. when the system is free of faults, these signals are, however, passed on to the first control unit 41 via a switchover device 66, which is a constituent part of the second control unit 42, and processed there.

Since the signal from the operator control element 45 of the electric parking brake is no longer available if the first control unit 41 fails, provision is made for the second control unit 42 to be connected to the vehicle bus 43 as well. A command for applying and releasing the parking brake actuator 36 can therefore be received in this fallback level. This signal can be generated outside the system limits of the braking system 1. For example, the park position of the selector lever of an automatic transmission can be used for this purpose.

In the braking system architecture, the aspect of electrical redundancy is also extended to the power supply. The first control unit 41 is supplied via two fused supply lines 48, 49. In addition, an independently fused supply line 58 is provided to supply the second control unit 42. In this case, the supply line 58 can be designed as a further supply line from the usual on-board power supply system of the vehicle. However, it is also possible to connect the supply line 58 to an independent on-board electrical system.

The ground connection 54, 57 is also provided in duplicate, i.e. a first ground line 54 connects the first control unit 41 and a second ground line 57 connects the second control unit 42. Due to the common signal processing, for example of the BUS signals 43, both ground lines 54, 57 are connected within the control device. A corresponding circuit module is provided in order to identify tearing of one of the ground lines 54, 57 and therefore the loss of redundancy.

Fault modes of the control units 41 and 42 are communicated to the partner systems of the control device via status signals, for example BUS signals, so that corresponding warning signals (warning lamps and messages) can be displayed to the driver. For example, the degraded (due to being reduced to a parking brake actuator) function of standstill protection but also the degradation of the service brake function is therefore displayed.

If the basic design of the braking system ensures that, even in the event of a total failure of both control devices 41, 42 or their power supplies 47, 58, the auxiliary braking effect according to ECE R13 H (2.44 m/s$^2$ with a pedal force of 500 N) is reached, in the event of a single fault (fault in one of the two units 41, 42 or a supply line) only a "yellow" brake warning lamp or a display message is required since the functioning of only one of the two units ensures that the service brake effect (6.43 m/s$^2$ with a pedal force of 500 N) is achieved.

The hydraulic braking system therefore meets the requirements of electrified vehicles with little additional cost compared to conventional braking systems. It uses the cost-effective and proven technology of vacuum brake boosting and includes a vacuum supply independent of the vehicle drive with the aid of an electric vacuum pump.

The invention claimed is:

1. A hydraulic braking system comprising:
a vacuum brake booster;
an electronic stability control (ESC) system with a hydraulic pump for generating braking force in a wheel-specific manner in a plurality of wheel brakes;
an ESC control device for driving the hydraulic pump;
a hydraulic pressure sensor for determining a hydraulic pressure in the hydraulic braking system;
an electric vacuum pump for supplying the vacuum brake booster;
a vacuum sensor which is connected to the ESC control device; and
wherein the ESC control device is designed to drive the electric vacuum pump logically and electrically; is designed to determine a run-out point of the vacuum brake booster from data from the vacuum sensor, is designed to identify exhaustion of the vacuum brake booster when hydraulic pressure is greater than the run-out point, and is designed to carry out brake boosting with the hydraulic pump in the event of exhaustion.

2. The hydraulic braking system as claimed in claim 1, wherein the ESC control device further comprises a-first and second control units each having a processor, wherein one of the first and second control units performs a portion of the functions of the ESC control device during normal operation and the other of the first and second control units performs the remaining functions of the ESC control device during normal operation, and wherein in the event of a fault in a control unit, the respective functions of that control unit are taken over by the respective other control unit.

3. The hydraulic braking system as claimed in claim 2, wherein functions for at least one of wheel slip control functions and a stability program are implemented on the first control unit during normal operation, including driving of the hydraulic pump, the hydraulic valves, detection of the hydraulic pressure sensor and/or detection of yaw rate and acceleration sensors.

4. The hydraulic braking system as claimed in claim 1, wherein functions for driving the vacuum pump are implemented on the second control unit during normal operation.

5. The hydraulic braking system as claimed in claim 1, wherein the ESC control device which is connected to the vacuum sensor is the second control unit.

6. The hydraulic braking system as claimed in claim 5, wherein the second control unit is designed to drive the vacuum pump based on the data from the vacuum sensor.

7. The hydraulic braking system as claimed in claim 6, wherein the second control unit is designed to activate the vacuum pump when functions for detecting the vacuum sensor fail and braking occurs, wherein the first control unit establishes braking is occurring by evaluating the data from the hydraulic pressure sensor and transmits the braking occurrence information to the second control unit via a communication link.

8. The hydraulic braking system as claimed in claim 7, wherein the second control unit is designed to activate the vacuum pump with a specified run-on time.

9. The hydraulic braking system as claimed in claim 6, wherein the first control unit is designed to carry out brake boosting with the hydraulic pump when at least one of the vacuum pump and the second control unit fails.

10. The hydraulic braking system as claimed in claim 1, wherein the ESC control device is designed to generate a boost pressure with the hydraulic pump for the purpose of brake boosting, wherein the boost pressure is calculated from the difference between the hydraulic pressure and the run-out point multiplied by a boost factor.

11. The hydraulic braking system as claimed in claim 10, wherein the ESC control device is designed to set the value of run-out pressure for determining the boost pressure to 0 bar when the vacuum sensor and the vacuum pump fail, wherein the boost factor used is smaller than the boost factor for a known run-out point.

12. The hydraulic braking system as claimed in claim 11, wherein the ESC control device is designed to increase the boost factor during braking until an original value is reached again.

13. The hydraulic braking system as claimed in claim 10, wherein the ESC control device is designed to determine the value of run-out pressure for determining the boost pressure from a last known measured value from the vacuum sensor when the vacuum sensor and the vacuum pump fail, wherein in each braking operation a decrease in the run-out point is calculated on a basis of a maximum hydraulic pressure reached during this braking operation and the run-out point is accordingly reduced.

14. The hydraulic braking system as claimed in claim 2, wherein two parking brake actuators are provided, wherein the first control unit is designed to drive at least one first parking brake actuator and the second control unit is designed to drive at least one second parking brake actuator.

* * * * *